(12) United States Patent
Voloshin-Sela et al.

(10) Patent No.: US 12,465,780 B2
(45) Date of Patent: Nov. 11, 2025

(54) ADJUSTING TUMOR TREATING FIELDS SIMULATION AND TREATMENT USING MOLECULAR IMAGING

(71) Applicant: Novocure GmbH, Root (CH)

(72) Inventors: Tali Voloshin-Sela, Haifa (IL); Lilach Avigdor, Haifa (IL); Reuven Ruby Shamir, Haifa (IL)

(73) Assignee: Novocure GmbH, Baar (CH)

( * ) Notice: Subject to any disclaimer, the term of this patent is extended or adjusted under 35 U.S.C. 154(b) by 502 days.

(21) Appl. No.: 17/967,018

(22) Filed: Oct. 17, 2022

(65) Prior Publication Data

US 2023/0149728 A1     May 18, 2023

Related U.S. Application Data

(60) Provisional application No. 63/278,643, filed on Nov. 12, 2021.

(51) Int. Cl.
    *A61N 1/40*     (2006.01)
    *C12Q 1/00*     (2006.01)

(52) U.S. Cl.
    CPC ............ *A61N 1/40* (2013.01); *C12Q 1/005* (2013.01)

(58) Field of Classification Search
    CPC ........ A61N 2007/0078; A61N 1/36002; A61N 1/40; A61B 8/085
    See application file for complete search history.

(56) References Cited

U.S. PATENT DOCUMENTS

| | | | |
|---|---|---|---|
| 7,565,205 B2 | 7/2009 | Palti | |
| 2019/0308016 A1 | 10/2019 | Wenger et al. | |
| 2020/0372705 A1 | 11/2020 | Hershkovich et al. | |
| 2021/0199640 A1* | 7/2021 | Patel | A61K 51/0459 |
| 2022/0237871 A1* | 7/2022 | Wong | G16H 10/20 |

FOREIGN PATENT DOCUMENTS

| | | |
|---|---|---|
| WO | 2017/072706 A1 | 5/2017 |
| WO | 2021/111186 A1 | 6/2021 |

* cited by examiner

*Primary Examiner* — Gerald Johnson
(74) *Attorney, Agent, or Firm* — McCarter & English, LLP; Michael A. Sartori

(57) ABSTRACT

A computer-implemented method to determine placement of transducers on a subject's body for applying tumor treating fields, the method including: determining a pair of locations on the subject's body for placement of a pair of transducer arrays based on image data; receiving a detected concentration of a target molecule within a target region of the subject's body from a molecular imaging apparatus, the concentration of the target molecule being detected after tumor treating fields are induced between the pair of transducer arrays; determining, based on the detected concentration of the target molecule, how the tumor treating fields were distributed in the target region; determining a recommendation of a second pair of locations on the subject's body for placement of the pair of transducer arrays based on the distribution of the tumor treating fields in the target region; and outputting the recommendation of the second pair of locations to a user.

20 Claims, 6 Drawing Sheets

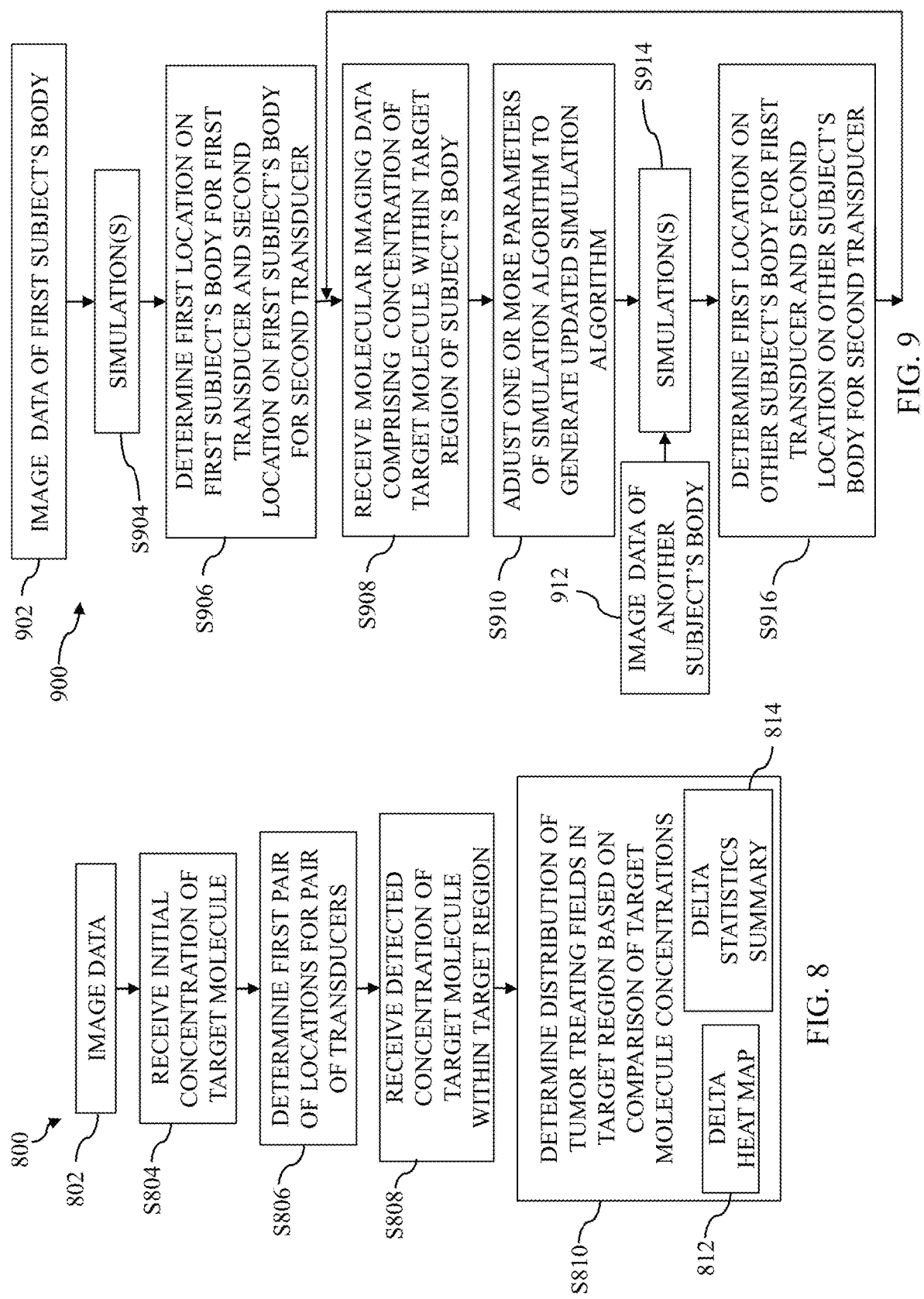

ADJUSTING TUMOR TREATING FIELDS SIMULATION AND TREATMENT USING MOLECULAR IMAGING

CROSS REFERENCE TO RELATED APPLICATIONS

This application claims priority to U.S. Patent Application No. 63/278,643 filed Nov. 12, 2021, which is incorporated herein by reference.

BACKGROUND

Tumor treating fields (TTFields) are low intensity alternating electric fields within the intermediate frequency range (for example, 50 kHz to 1 MHz), which may be used to treat tumors as described in U.S. Pat. No. 7,565,205. TTFields are induced non-invasively into the region of interest by transducers placed on the patient's body and applying AC voltages between the transducers. Conventionally, a first pair of transducers and a second pair of transducers are placed on the subject's body. AC voltage is applied between the first pair of transducers for a first interval of time to generate an electric field with field lines generally running in the front-back direction. Then, AC voltage is applied at the same frequency between the second pair of transducers for a second interval of time to generate an electric field with field lines generally running in the right-left direction. The system then repeats this two-step sequence throughout the treatment.

BRIEF DESCRIPTION OF THE DRAWINGS

FIG. 8 is a flowchart depicting an example of determining a distribution of TTFields.

FIG. 9 is a flowchart depicting an example of calibrating a simulation algorithm.

DESCRIPTION OF EMBODIMENTS

This application describes exemplary methods to apply TTFields to a subject's body for treating one or more cancers. This application also describes exemplary methods to determine placement of transducers on a subject's body for applying TTFields.

Imaging data and simulations are used to determine locations for placement of transducers for applying TTFields to a target region of a subject's body. However, there exists a need to assess early on whether a tumor is responding to TTFields therapy.

The distribution or concentration of certain molecules in a subject's body can indicate a tumor response to TTFields, which may be desirable. For example, pyruvate kinase M2 (PKM2) is a marker of cancer metabolic reprogramming since it catalyzes the final step in glycolysis. TTFields reduce PKM2 expression in a tumor, indicating a shift from aberrant glycolysis towards oxidative phosphorylation. PKM2 expression in a tumor can be detected via molecular imaging, e.g., using [18F]DASA-23 as an imaging agent (e.g., radiotracer). Other molecules may be used with the exemplary embodiments to indicate a tumor response to TTFields. Other molecular imaging or molecular detecting techniques may be used with the exemplary embodiments to detect molecules that indicate a tumor response to TTFields.

The disclosed methods use the detection of a target molecule to determine locations on a subject's body for placement of a pair of transducers used to apply TTFields to a region of the subject's body. Detecting the target molecule may enable evaluation of the distribution of TTFields in vivo, as well as calibration of simulation software used to recommend transducer locations. Evaluating the effectiveness of TTFields in vivo using molecular imaging may reduce the number of expensive high-resolution images (e.g., magnetic resonance imaging (Mills)) needed throughout cancer treatment.

Figure 1:
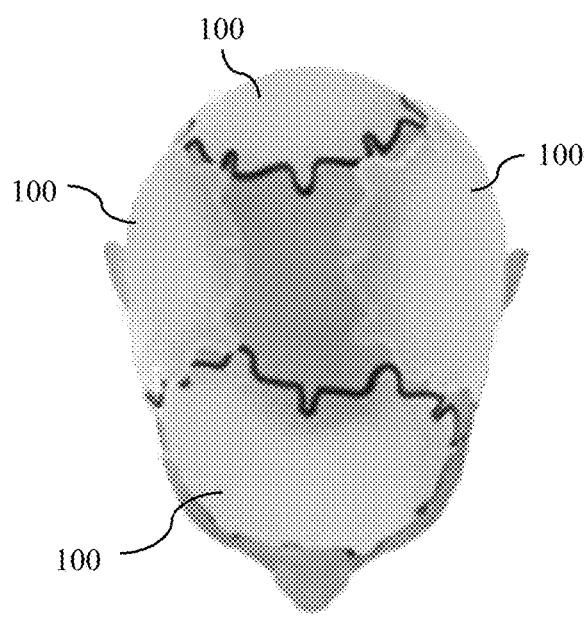
FIG. 1 depicts an example of transducers located on a subject's head.
Figure 2:
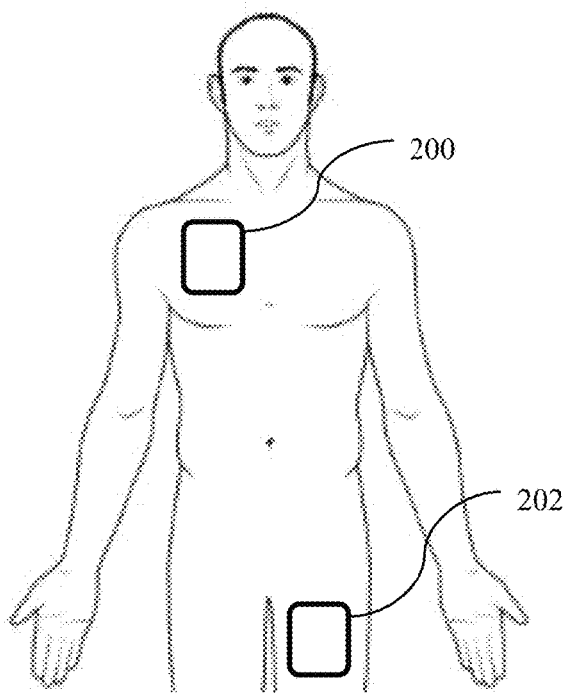
FIG. 2 depicts an example of transducers located on a subject's torso.

FIG. 1 depicts an example of transducers 100 positioned on the head of a subject's body. FIG. 1 depicts one example of a subject's head on which transducers 100 are placed in various positions and/or orientations. Transducers 100 arranged on a subject's head are capable of applying TTFields to a tumor in a region of the subject's brain. FIG. 2 depicts an example of transducers positioned at locations on a subject's torso. FIG. 2 depicts a transducer 200 located on the front of the subject's right thorax and a transducer 201 located on the front of the subject's left thigh. Transducers arranged on a subject's torso are capable of applying TTFields to a tumor in the subject's thorax or abdomen. The transducers may be located at various other combinations of locations on the subject's body than those of FIGS. 1 and 2.

Figure 3A:
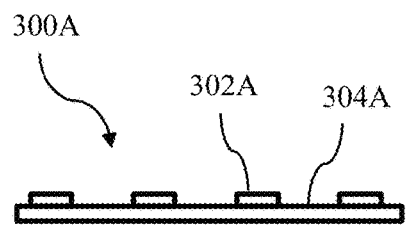
FIGS. 3A and 3B depict examples of the structure of various transducers.
Figure 3B:
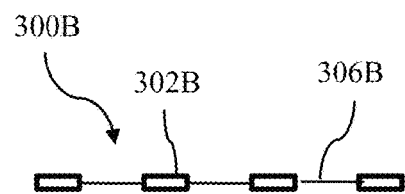

The structure of the transducers may take many forms. The transducers may be affixed to the subject's body or attached to or incorporated in clothing covering the subject's body. In FIG. 3A, the transducer 300A has a plurality of electrode elements 302A positioned on a substrate 304A. The substrate 304A is configured for attaching the transducer 300A to a subject's body. Suitable materials for the substrate 304A include, for example, cloth, foam, flexible plastic, and/or a conductive medical gel. In the case of conductive medical gel, the transducer 300A may be affixed to the subject's body via the substrate 304A. The transducer may be conductive or non-conductive. FIG. 3B depicts another example of the structure of the transducer 300B. In this example, the transducer 300B includes a plurality of electrode elements 302B that are electrically and mechanically connected to one another without a substrate. In one example, electrode elements 302B are connected to each other through conductive wires 306B. Any constructions for implementing the transducer (or electric field generating device) for use with embodiments of the invention may be used, as long as they are capable of (a) delivering TTFields to the subject's body and (b) being positioned at the locations specified herein.

Figure 4:
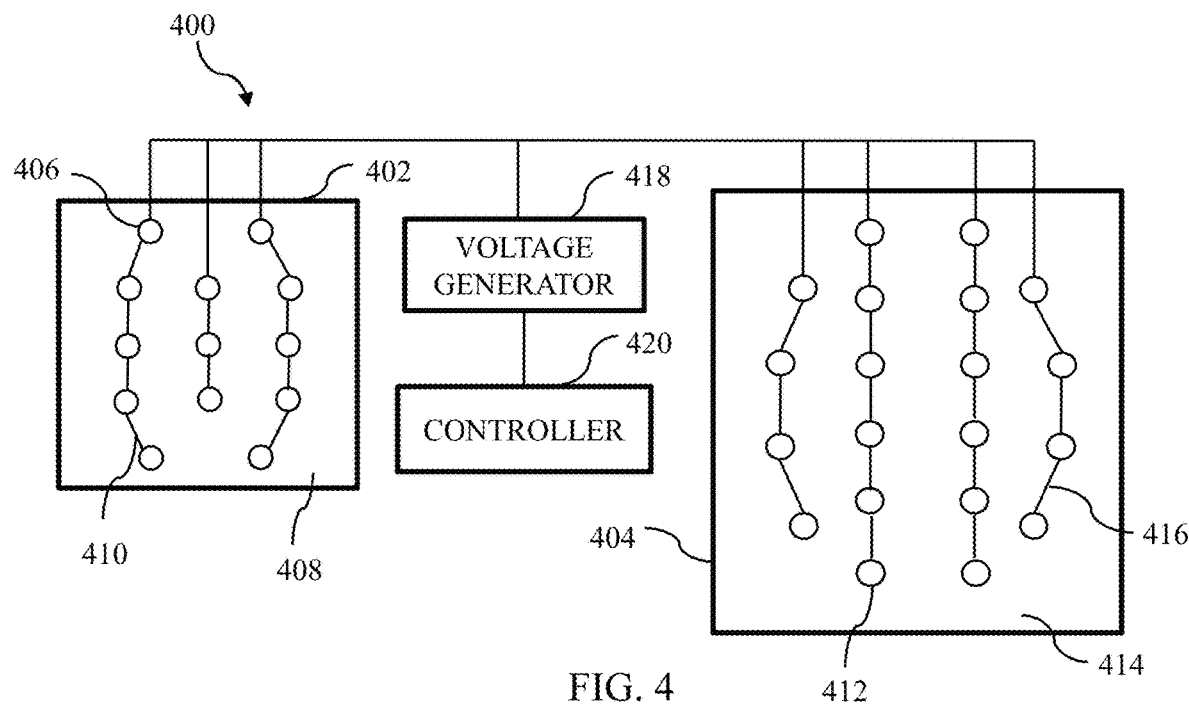
FIG. 4 depicts an example of a configuration of one pair of transducers.

FIG. 4 depicts an example configuration of one pair of transducers 402 and 404. In this example, the first transducer 402 includes 13 electrode elements 406 which are positioned on the substrate 408 and electrically and mechanically connected to one another through a conductive wiring 410. Similarly, the second transducer 404 includes 20 electrode elements 412 which are positioned on the substrate 414 and electrically and mechanically connected to one another through a conductive wiring 416. The transducers 402 and 404 are connected to an AC voltage generator 418 and a controller 420. The controller 420 may include one or more processors and memory accessible by the one or more processors. The memory may store instructions that when executed by the one or more processors control the AC voltage generator 418 to induce an electric field between the two transducers 402 and 404.

Figure 5:
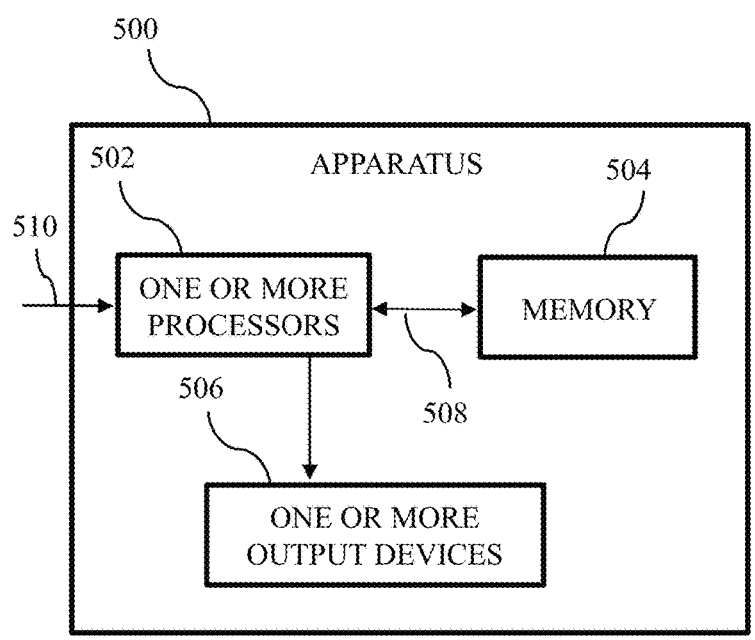
FIG. 5 depicts an example of an apparatus to determine locations of transducers on a subject's body for applying TTFields.

FIG. 5 depicts an exemplary apparatus to determine locations of transducers for applying TTFields. In this example, the apparatus 500 includes one or more processors 502, a memory 504, and one or more output devices 506. The memory 504 is accessible by the one or more processors 502 via a link 508 so the one or more processors 502 can read information from and write information to the memory 504. The memory 504 stores instructions that, when executed by the one or more processors 502, cause the apparatus 500 to perform one or more methods disclosed herein. The one or more processors 502 may receive user input 510 and/or inputs 510 from a molecular imaging apparatus. The inputs 510 may include, for example, a detected concentration of a target molecule. Based on the inputs 510, the one or more processors 502 make one or more recommendations of transducer locations to a user, which are output by the output devices 506.

TTFields activity is related to the reduction of PKM2 protein activity (a biomarker) in a region of interest of a subject's body. As such, a reduced [18F]DASA-23 signal is obtained following TTFields exposure. PKM2 protein activity in cells can be used to determine whether transducers are positioned at locations on the subject's body where the resulting TTFields will be effective. Methods disclosed herein may be used to estimate a reduction of PKM2 in a target region and to adjust the locations of transducers accordingly. Making such determinations involves aligning molecular imaging data (e.g., PKM2 probe data) with imaging data (e.g., obtained using MRI, positron emission tomography-computed tomography (PET-CT), PET-MRI, or another imaging modality).

Figure 6A:
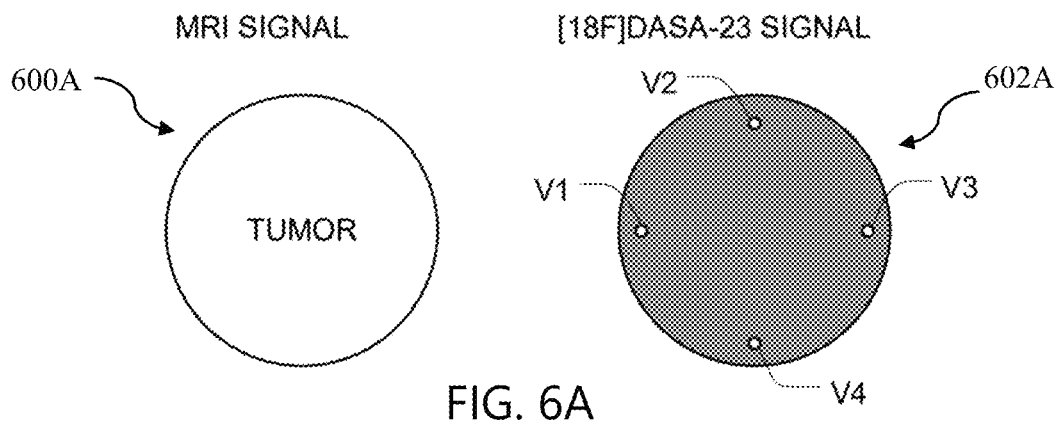
FIGS. 6A-6C depict examples of aligning an image showing the concentration of a target molecule with imaging data.
Figure 6B:
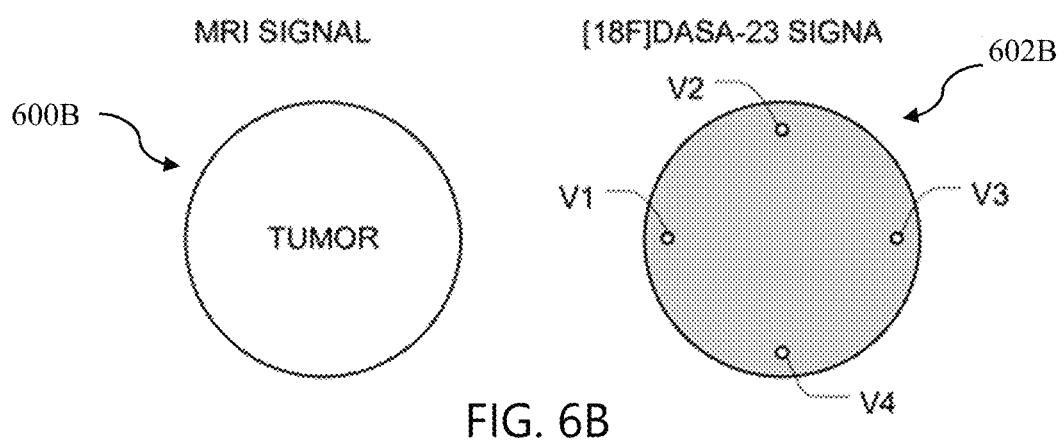
Figure 6C:
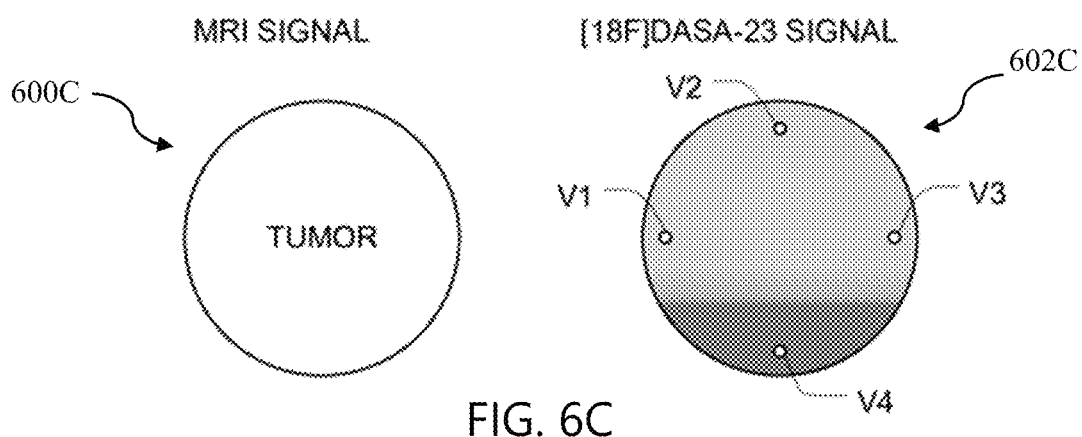

FIGS. 6A-6C illustrate three examples of aligning data regarding concentration of a target molecule with MRI images 600A, 600B, 600C, respectively. However, as described above, other imaging modalities may be used. The MRI images 600A, 600B, and 600C define the target region (e.g., tumor). An image showing the concentration of a target molecule (e.g., [18F]DASA-23) in a segment of the target region is aligned with the image data (e.g., 600A, 600B, 600C) in the segment of the target region to generate revised tumor segmentations 602A, 602B, 602C. The revised tumor segmentations may include target molecule values in each pixel or voxel (e.g., V1-V4 of FIGS. 6A-6C) associated with a tumor. Revised tumor segmentations 602A, 602B, 602C show relative target molecule concentrations (e.g., darker indicates higher signal intensity, and lighter indicates lower signal intensity) and may be used to determine transducer locations.

FIG. 6A may represent a baseline determination of the [18F]DASA-23 signal (e.g., 602A) in a target region of a subject's body prior to application of TTFields to the subject's body. Without TTFields, the [18F]DASA-23 signal intensity is relatively high throughout the target region. FIGS. 6B and 6C represent determinations of the [18F]DASA-23 signal in the target region after application of TTFields from transducers on the subject's body.

In FIG. 6B, application of TTFields has resulted in a reduced (e.g. substantially low) [18F]DASA-23 signal and substantially uniform signal throughout the image of the region of interest (e.g., 602B). This indicates that the positioning of the transducers used to generate TTFields is appropriate for covering the target region. That is, the positioning of the transducers gives rise to a sufficiently high intensity (or high power density) of TTFields within the region of interest. As a result of this determination, the locations of the transducers on the subject's body would not need to be changed before applying additional TTFields.

In FIG. 6C, the image of the [18F]DASA-23 signal is not sufficiently low or uniform within the entire region of interest (e.g., 602C). This indicates that the positioning of the transducers used to generate TTFields is not optimum for covering that region of interest. Thus, the transducers' positioning should be changed, after which another image of the [18F]DASA-23 signal can be obtained and aligned with the image 600C. If the transducer layout/placement is improved with respect to the original positioning, the next [18F]DASA-23 signal in the image would be lower. This process may be repeated until the [18F]DASA-23 signal is sufficiently low and uniform within the region of interest to indicate effective TTFields coverage.

Figure 7:
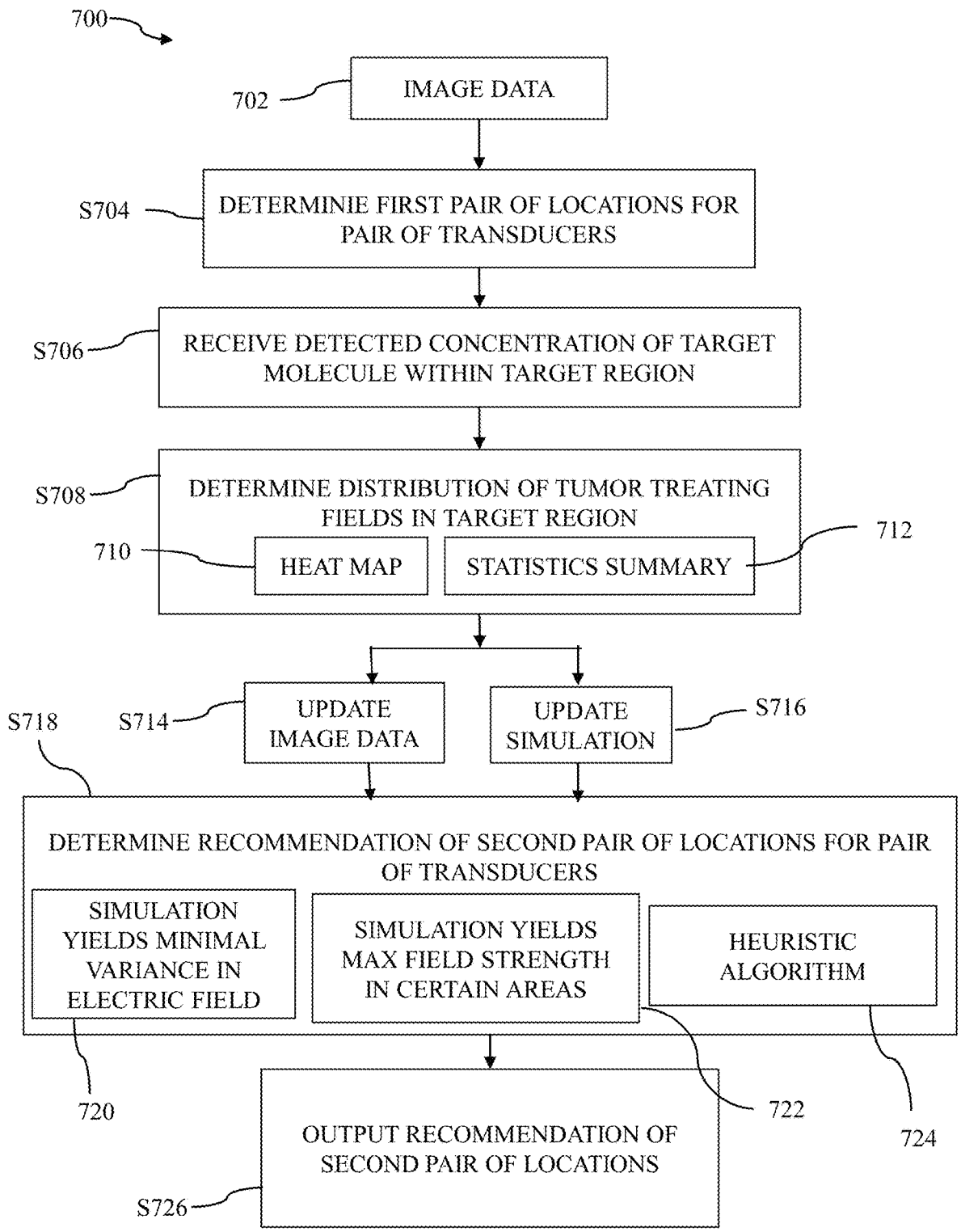
FIG. 7 is a flowchart depicting an example of determining placement of transducers on a subject's body for applying TTFields.

FIG. 7 is a flowchart depicting an example method 700 of determining placement of transducers on a subject's body for applying TTFields. As illustrated, the method 700 may begin with receiving image data 702 associated with the subject's body. The image data 702 may be at least one of: magnetic resonance imaging data, computed tomography data, positron emission tomography data, X-ray imaging data, PET-CT data, PET-MRI data, or others.

At step S704, the method 700 includes determining a first pair of locations on the subject's body for placement of a pair of transducer arrays based on the image data 702 of the subject's body. This may involve, for example, performing one or more simulations (using a simulation algorithm) of the expected electric field distribution through the target region of the subject's body based on the image data 702. More particularly, the determination may be made by comparing simulations for different possible transducer location pairs and ranking/recommending a pair of transducer locations based on expected electric field distributions.

At step S706, the method 700 includes receiving a detected concentration of a target molecule within a target region of the subject's body from a molecular imaging apparatus. The concentration of the target molecule is detected after TTFields are induced between the pair of transducer arrays located at the first pair of locations. The target molecule may be [18F]DASA-23, and the molecular imaging apparatus may be a PKM2 probe. At step S708, the method 700 may include determining, based on the detected concentration of the target molecule, how the TTFields were distributed in the target region of the subject's body. This may involve, as discussed with respect to FIGS. 6A-6C, aligning an image showing the concentration of the target molecule in a segment of the target region with the image data in the segment of the target region to generate a revised tumor segmentation. Determining how the TTFields were distributed may include generating a heat map visualization 710 of the target region or a statistics summary 712 (with statistics such as average, variation, paired t-test, or others) of amounts of the target molecule in the region. This provides a spatial distribution of [18F]DASA-23 in the target region, which can be used to estimate effectiveness of the TTFields based on the evenness of the distribution across the target region. If the distribution of the [18F]DASA-23 signal is highly uneven, an adjustment to the placement of the transducers on the subject's body may be desired.

The method 700 may include updating the image data (e.g., 702) of the subject's body at step S714 based on the distribution of the TTFields in the target region. In particular, an uneven distribution of the TTFields in the target region may indicate that the target region itself (e.g., the area where the tumor is believed to be located) does not match the actual location of the target (e.g., tumor) in the subject's body. The method 700 may thus be used to detect spatial changes in the tumor over time, in addition to or in lieu of additional imaging. The updated image data may be stored in memory and/or used to determine updated transducer locations.

At step S716, the method 700 may include updating a simulation algorithm used to determine an expected electric field distribution through a target region based on the distribution of TTFields in the target region. In particular, an uneven distribution of the TTFields in the target region may indicate that the simulation algorithm used to determine the recommend transducer locations is not well calibrated and should be updated. As such, the method 700 may be used to update and refine the simulation algorithm to provide more accurate simulations and recommendations of locations for transducer placement on the subject's body.

At step S718, the method 700 includes determining a recommendation of a second pair of locations on the subject's body for placement of the pair of transducer arrays based on the distribution of the tumor treating fields in the target region of the subject's body. In an example, the recommendation of the second pair of locations on the subject's body may be determined based on the updated image data (S714). In another example, the recommendation of the second pair of locations on the subject's body may be based on the updated simulation algorithm (S716).

In some instances, step S718 may determine a recommendation in which the second pair of locations on the subject's body is the same as the first pair of locations on the subject's body (e.g., if it is determined at step S708 that the distribution of the TTFields in the target region was relatively even). In other instances, step S718 may determine a recommendation in which the second pair of locations on the subject's body is different from the first pair of locations (e.g., if it is determined at step S708 that the distribution of the TTFields in the target region was sub-optimal based on the [18F]DASA-23 signal levels).

Different approaches may be used to determine the recommendation of the second pair of locations at step S718. For example, step S718 may include: selecting a plurality of pairs of locations on the subject's body for placement of the pair of transducer arrays; simulating, for each pair of locations, an expected electric field distribution through the target region for an electric field induced between the pair of transducer arrays at the pair of locations; and determining the recommendation of the second pair of locations to be the pair of locations for which the simulation yields a minimal variance of the electric field distribution in a user-defined target region (720) while maintaining at least a predetermined electric field strength in the target region. In this way, the transducer locations may be selected to ensure a minimal variance of the TTFields, resulting in a more even [18F] DASA-23 signal distribution.

In another example, step S718 may include: selecting a plurality of pairs of locations on the subject's body for placement of the pair of transducer arrays; simulating, for each pair of locations, an expected electric field distribution through the target region for an electric field induced between the pair of transducer arrays at the pair of locations; and determining the recommendation of the second pair of locations to be the pair of locations for which the simulation yields a maximum electric field strength (722) in portions of the user-defined target region where the tumor treating fields did not reach a predetermined electric field strength. In this way, the transducer locations may be selected to maximize the TTFields in tumor area(s) where the [18F]DASA-23 signal indicated non-reduced PKM2 prevalence.

In another example, step S718 may include determining the recommendation of the second pair of locations by applying a heuristic algorithm (724) suggesting a change in locations of the pair of transducer arrays, which may be expected to provide an increased distribution of TTFields in the target region.

At step S726, the method 700 includes outputting the recommendation of the second pair of locations to a user. The output may be a recommendation for transducer array locations based on the [18F]DASA-23 signal to provide better TTFields coverage going forward.

FIG. 8 is a flowchart depicting an example method 800 to determine a distribution of TTFields in a target region. Steps S804-S810 in the method 800 may take the place of steps S702-S708 in the method 700 of FIG. 7. The method 800 may begin with receiving image data 802 associated with the subject's body, similar to the image data 702 of FIG. 7. At step S804, the method 800 includes receiving an initial concentration of the target molecule within the target region of the subject's body from a molecular imaging apparatus. At step S806, the method 800 includes determining a first pair of locations on the subject's body for placement of a pair of transducer arrays based on the image data 802. In an example, the first pair of locations on the subject's body may be determined based on the image data 802 and the initial concentration (S804) of the target molecule in the region. In another example, the first pair of locations on the subject's body may be determined based on image data 802 alone, similar to step S704 of FIG. 7.

At step S808, the method includes receiving a detected concentration of a target molecule within a target region of the subject's body from a molecular imaging apparatus, similar to step S706 of FIG. 7. At step S810, the method may include determining how the TTFields were distributed in the target region of the subject's body, based on a comparison between the initial concentration of the target molecule (S804) and the detected concentration of the target molecule (S808) within the target region. At step S810, determining how the TTFields were distributed may include generating a heat map visualization 812 showing a change (delta) in the amounts of the target molecule from the initial concentration to the concentration detected after TTFields were applied. At step S810, determining how the TTFields were distributed may include generating a statistics summary 814 (e.g., including an average, variation, paired t-test, or others) representing a change (delta) in the amounts of the target molecule from the initial concentration to the concentration detected after TTFields were applied. This provides a spatial representation of how the PKM2 protein is changing with time in the target region, which can be used to estimate an effectiveness of the TTFields. If the change in the [18F] DASA-23 signal is highly uneven, an adjustment to the placement of the transducers on the subject's body may be desired. The method 800 may then proceed to step(s) S714/S716/S718 of FIG. 7.

FIG. 9 is a flowchart depicting an example method 900 of calibrating a simulation algorithm. The method 900 may begin with receiving image data 902 associated with a first subject's body, similar to 702 of FIG. 7. At step S904, the method 900 includes performing one or more simulations, using a simulation algorithm, of an expected electric field distribution through a target region of the first subject's body based on the image data 902. At step S906, the method 900 includes determining a first location on the first subject's body for placement of a first transducer and a second location on the first subject's body for placement of a second transducer based on the simulation(s). This may involve, for example, comparing simulation results for multiple transducer location pairs and ranking the transducer location pairs based on their expected electric field distribution to make a recommendation.

At step S908, the method 900 includes receiving molecular imaging data comprising a concentration of a target molecule (e.g., [18F]DASA-23) within the target region of the first subject's body, after an electric field is induced between the first transducer located at the first location on the first subject's body and the second transducer located at the second location on the first subject's body. At step S910, the method 900 includes adjusting one or more parameters of the simulation algorithm based on the concentration of the target molecule within the target region of the first subject's body, so as to generate an updated simulation algorithm. The simulation may be automatically adjusted based on the [18F]DASA-23 signal in a way that is expected to improve the accuracy of future simulations and resulting transducer location recommendations. The update(s) are intended to yield a more even distribution of TTFields (indicated by an even distribution of [18F]DASA-23) during future applications of TTFields.

The method 900 may include receiving image data 912 associated with a second subject's body, similar to image data 702 of FIG. 7. At step S914, the method 900 includes performing one or more second simulations, using the updated simulation algorithm, of an expected electric field distribution through a target region of the second subject's body based on the image data 912 associated with the second subject's body. At step S916, the method 900 includes determining a first location on the second subject's body for placement of a first transducer and a second location on the second subject's body for placement of a second transducer based on the second simulation(s) of step S914. That is, the updated simulation generated based on feedback from the application of TTFields to the first subject's body may be used to improve the positioning of transducers on other subjects' bodies. In some embodiments, the updated simulation algorithm (S910) may be used to perform simulations (S914) and determine new locations for transducers (S916) on the first subject's body as well.

S908-S916 may be repeated iteratively on the same subject's body, or on different subjects' bodies. For example, the method 900 may include receiving molecular imaging data (S908) comprising a concentration of the target molecule within the target region of the second subject's body after an electric field is induced between the first transducer located at the first location on the second subject's body and the second transducer located at the second location on the second subject's body; adjusting one or more parameters of the simulation algorithm (S910) based on the concentration of the target molecule within the target region of the second subject's body to generate a second updated simulation algorithm; receiving image data (912) associated with a third subject's body; performing one or more third simulations (S914), using the second updated simulation algorithm, of an expected electric field distribution through a target region of the third subject's body based on the image data associated with the third subject's body; and determining a first location on the third subject's body for placement of a first transducer and a second location on the third subject's body for placement of a second transducer (S916) based on the third simulation(s). This process may be repeated for target regions of any number of subjects to further calibrate and improve the accuracy of the simulation algorithm.

Figure 10:
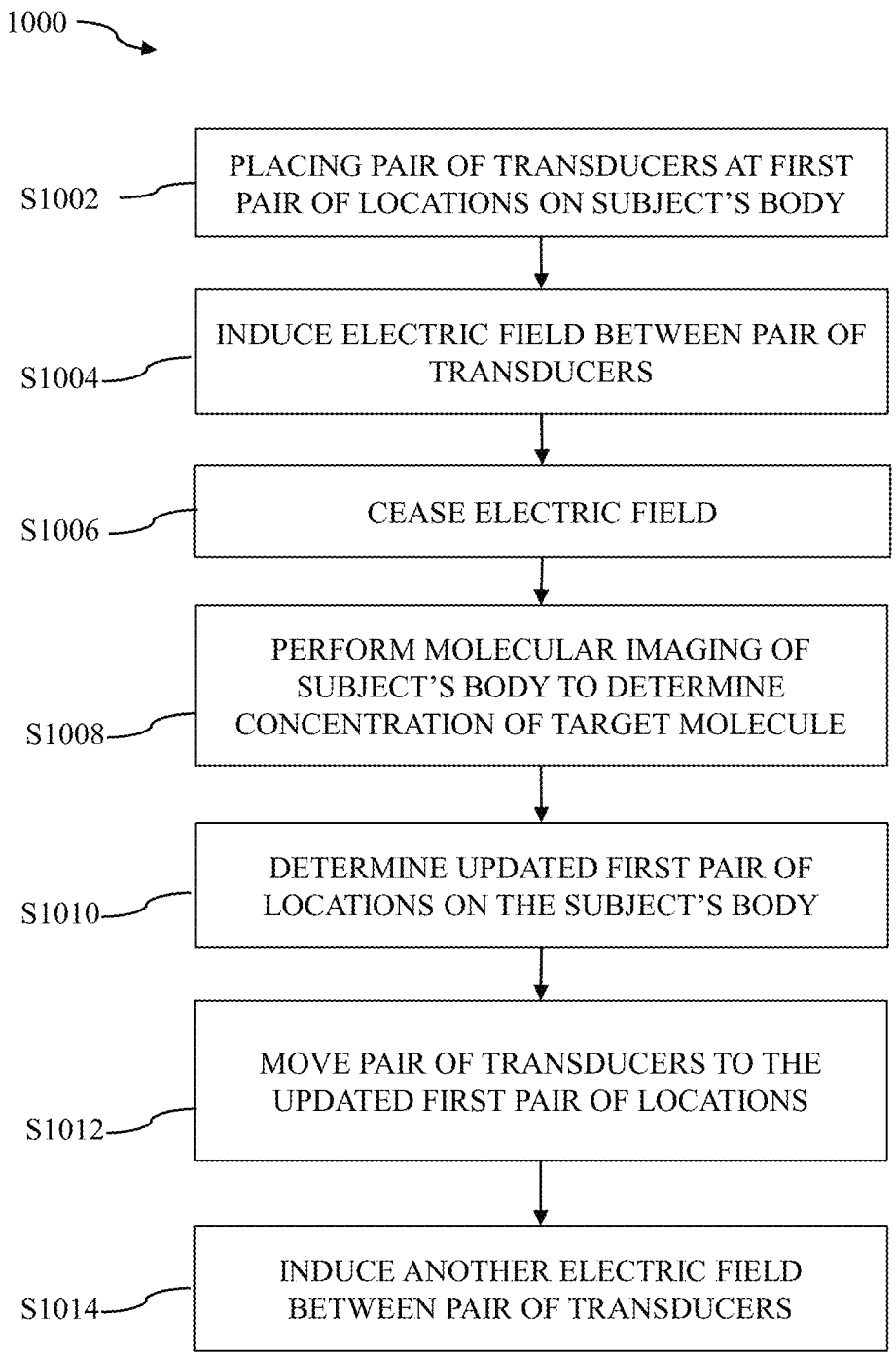
FIG. 10 is a flowchart depicting an example of applying TTFields to a region of interest within a subject's body.

FIG. 10 is a flowchart depicting an example method 1000 of applying TTFields to a region of interest within a subject's body. At step S1002, the method 1000 includes placing a pair of transducers at a first pair of locations on the subject's body. The method 1000 includes, at step S1004, inducing an electric field between the pair of transducers located at the first pair of locations on the subject's body, and at step S1006, ceasing the electric field. After ceasing the electric field, at step S1008, the method 1000 includes performing molecular imaging of the subject's body to determine a concentration of a target molecule within the region of interest. At step S1010, the method 1000 includes determining an updated first pair of locations on the subject's body for placement of the pair of transducers, based on the concentration of the target molecule. The method 1000 includes, at step S1012, moving the pair of transducers to the updated first pair of locations on the subject's body, and at step S1014, inducing another electric field between the pair of transducers. Steps S1006-S1014 of the method 1000 may be repeated multiple times and at regular intervals throughout a subject's treatment using TTFields.

The invention includes other illustrative embodiments ("Embodiments") as follows.

Embodiment 1: A computer-implemented method to determine placement of transducers on a subject's body for applying tumor treating fields, the computer comprising one or more processors and memory accessible by the one or more processors, the memory storing instructions that when executed by the one or more processors cause the computer to perform the method, the method comprising: determining a first pair of locations on the subject's body for placement of a pair of transducer arrays based on image data of the subject's body; receiving a detected concentration of a target molecule within a target region of the subject's body from a molecular imaging apparatus, the concentration of the target molecule being detected after tumor treating fields are induced between the pair of transducer arrays located at the first pair of locations; determining, based on the detected concentration of the target molecule, how the tumor treating fields were distributed in the target region of the subject's body; determining a recommendation of a second pair of locations on the subject's body for placement of the pair of transducer arrays based on the distribution of the tumor treating fields in the target region of the subject's body; and outputting the recommendation of the second pair of locations to a user.

Embodiment 2: The computer-implemented method of Embodiment 1, wherein the target molecule comprises [18F]DASA-23. Embodiment 3: The computer-implemented method of Embodiment 1, wherein the molecular imaging apparatus comprises a pyruvate kinase M2 (PKM2) probe. Embodiment 4: The computer-implemented method of Embodiment 1, further comprising: based on the distribution of the tumor treating fields in the target region, updating the image data of the subject's body; and determining the recommendation of the second pair of locations on the subject's body based on the updated image data. Embodiment 5: The computer-implemented method of Embodiment 1, further comprising: aligning an image showing the concentration of the target molecule in a segment of the target region with the image data in the segment of the target region to generate a revised tumor segmentation, the revised tumor segmentation comprising the target molecule values in each pixel or voxel associated with a tumor; and determining the recommendation of the second pair of locations on the subject's body based on the revised tumor segmentation. Embodiment 6: The computer-implemented method of Embodiment 1, wherein the second pair of locations on the subject's body is different from the first pair of locations on the subject's body if it is determined that the distribution of the tumor treating fields in the target region was suboptimal. Embodiment 7: The computer-implemented method of Embodiment 1, wherein the second pair of locations on the subject's body is the same as the first pair of locations on the subject's body. Embodiment 8: The computer-implemented method of Embodiment 1, further comprising: receiving an initial concentration of the target molecule within the target region of the subject's body from a molecular imaging apparatus; and determining the recommendation of the second pair of locations on the subject's body based on a comparison between the initial concentration of the target molecule and the detected concentration of the target molecule within the target region. Embodiment 9: The computer-implemented method of Embodiment 8, wherein determining how the tumor treating fields were distributed in the target region comprises generating a heat map visualization or statistics summary of a change in amounts of the target molecule. Embodiment 10: The computer-implemented method of Embodiment 8, further comprising: determining the first pair of locations on the subject's body for placement of the pair of transducer arrays based on the image data of the subject's body and the initial concentration of the target molecule within the target region. Embodiment 11: The computer-implemented method of Embodiment 1, wherein determining how the tumor treating fields were distributed in the target region comprises generating a heat map visualization or statistics summary of amounts of the target molecule. Embodiment 12: The computer-implemented method of Embodiment 1, further comprising: selecting a plurality of pairs of locations on the subject's body for placement of the pair of transducer arrays; simulating, for each pair of locations, an expected electric field distribution through the target region for an electric field induced between the pair of transducer arrays at the pair of locations; and determining the recommendation of the second pair of locations to be the pair of locations for which the simulation yields a minimal variance of the electric field distribution in the target region while maintaining at least a predetermined electric field strength in the target region. Embodiment 13: The computer-implemented method of Embodiment 1, further comprising: selecting a plurality of pairs of locations on the subject's body for placement of the pair of transducer arrays; simulating, for each pair of locations, an expected electric field distribution through the target region for an electric field induced between the pair of transducer arrays at the pair of locations; and determining the recommendation of the second pair of locations to be the pair of locations for which the simulation yields a maximum electric field strength in portions of the target region where the tumor treating fields did not reach a predetermined electric field strength. Embodiment 14: The computer-implemented method of Embodiment 1, further comprising: determining the recommendation of the second pair of locations by applying a heuristic algorithm suggesting a change in locations of the pair of transducer arrays, the change in locations being expected to provide an increased distribution of tumor treating fields in the target region.

Embodiment 15: A computer-implemented method to determine placement of transducers on a subject's body for applying tumor treating fields, the computer comprising one or more processors and memory accessible by the one or more processors, the memory storing instructions that when executed by the one or more processors cause the computer to perform the method, the method comprising: performing one or more simulations, using a simulation algorithm, of an expected electric field distribution through a target region of a first subject's body based on image data associated with the first subject; determining a first location on the first subject's body for placement of a first transducer and a second location on the first subject's body for placement of a second transducer based on the one or more simulations; receiving molecular imaging data comprising a concentration of a target molecule within the target region of the first subject's body after an electric field is induced between the first transducer located at the first location on the first subject's body and the second transducer located at the second location on the first subject's body; adjusting one or more parameters of the simulation algorithm based on the concentration of the target molecule within the target region of the first subject's body to generate an updated simulation algorithm; receiving image data associated with a second subject's body; performing one or more second simulations, using the updated simulation algorithm, of an expected electric field distribution through a target region of the second subject's body based on the image data associated with the second subject's body; and determining a first location on the second subject's body for placement of a first transducer and a second location on the second subject's body for placement of a second transducer based on the one or more second simulations.

Embodiment 16: The computer-implemented method of Embodiment 15, further comprising: performing one or more additional simulations, using the updated simulation algorithm, of the expected electric field distribution through the target region of the first subject's body based on the image data associated with the first subject's body; and determining a recommendation of a second pair of locations for placement of the first transducer and the second transducer on the first subject's body based on the one or more additional simulations. Embodiment 17: The computer-implemented method of Embodiment 15, further comprising: receiving molecular imaging data comprising a concentration of the target molecule within the target region of the second subject's body after an electric field is induced between the first transducer located at the first location on the second subject's body and the second transducer located at the second location on the second subject's body; adjusting one or more parameters of the simulation algorithm based on the concentration of the target molecule within the target region of the second subject's body to generate a second updated simulation algorithm; receiving image data associated with a third subject's body; performing one or more third simulations, using the second updated simulation algorithm, of an expected electric field distribution through a target region of the third subject's body based on the image data associated with the third subject's body; and determining a first location on the third subject's body for placement of a first transducer and a second location on the third subject's body for placement of a second transducer based on the one or more third simulations. Embodiment 18: The computer-implemented method of Embodiment 15, wherein the image data associated with the first subject's body and the image data associated with the second subject's body comprises at least one of: magnetic resonance imaging data, computed tomography data, positron emission tomography data, or X-ray imaging data.

Embodiment 19: A method of applying tumor treating fields to a region of interest within a subject's body, the method comprising: placing a pair of transducers at a first pair of locations on the subject's body; inducing an electric field between the pair of transducers located at the first pair of locations on the subject's body; ceasing the electric field; after ceasing the electric field, performing molecular imaging of the subject's body to determine a concentration of a target molecule within the region of interest; determining an updated first pair of locations on the subject's body for placement of the pair of transducers, based on the concentration of the target molecule; moving the pair of transducers to the updated first pair of locations on the subject's body; and inducing another electric field between the pair of transducers. Embodiment 20: The method of Embodiment 19, further comprising: updating a simulation algorithm based on the concentration of the target molecule; performing one or more simulations of an expected electric field distribution within a region of interest in a second subject's body using the updated simulation algorithm; and determining a first pair of locations on the second subject's body based on the one or more simulations.

Numerous modifications, alterations, and changes to the described embodiments are possible without departing from the scope of the present invention defined in the claims. It is intended that the present invention not be limited to the described embodiments, but that it has the full scope defined by the language of the following claims, and equivalents thereof.

What is claimed is:

1. A computer-implemented method to determine placement of transducers on a subject's body for applying tumor treating fields, the computer comprising one or more processors and memory accessible by the one or more processors, the memory storing instructions that when executed by the one or more processors cause the computer to perform the method, the method comprising:
   determining a first pair of locations on the subject's body for placement of a pair of transducer arrays based on image data of the subject's body;
   receiving a detected concentration of a target molecule within a target region of the subject's body from a molecular imaging apparatus, the concentration of the target molecule being detected after tumor treating fields are induced between the pair of transducer arrays located at the first pair of locations;
   determining, based on the detected concentration of the target molecule, a distribution of the tumor treating fields in the target region of the subject's body;
   determining a recommendation of a second pair of locations on the subject's body for placement of the pair of transducer arrays based on the distribution of the tumor treating fields in the target region of the subject's body; and
   outputting the recommendation of the second pair of locations to a user.

2. The computer-implemented method of claim 1, wherein the target molecule comprises [18F]DASA-23.

3. The computer-implemented method of claim 1, wherein the molecular imaging apparatus comprises a pyruvate kinase M2 (PKM2) probe.

4. The computer-implemented method of claim 1, further comprising:
   based on the distribution of the tumor treating fields in the target region, updating the image data of the subject's body; and
   determining the recommendation of the second pair of locations on the subject's body based on the updated image data.

5. The computer-implemented method of claim 1, further comprising:
   aligning an image showing the concentration of the target molecule in a segment of the target region with the image data in the segment of the target region to generate a revised tumor segmentation, the revised tumor segmentation comprising the target molecule values in each pixel or voxel associated with a tumor; and
   determining the recommendation of the second pair of locations on the subject's body based on the revised tumor segmentation.

6. The computer-implemented method of claim 1, wherein the second pair of locations on the subject's body is different from the first pair of locations on the subject's body if it is determined that the distribution of the tumor treating fields in the target region was sub-optimal.

7. The computer-implemented method of claim 1, wherein the second pair of locations on the subject's body is the same as the first pair of locations on the subject's body.

8. The computer-implemented method of claim 1, further comprising:
   receiving an initial concentration of the target molecule within the target region of the subject's body from a molecular imaging apparatus; and
   determining the recommendation of the second pair of locations on the subject's body based on a comparison between the initial concentration of the target molecule and the detected concentration of the target molecule within the target region.

9. The computer-implemented method of claim 8, wherein determining how the tumor treating fields were distributed in the target region comprises generating a heat map visualization or statistics summary of a change in amounts of the target molecule.

10. The computer-implemented method of claim 8, further comprising:
    determining the first pair of locations on the subject's body for placement of the pair of transducer arrays based on the image data of the subject's body and the initial concentration of the target molecule within the target region.

11. The computer-implemented method of claim 1, wherein determining how the tumor treating fields were distributed in the target region comprises generating a heat map visualization or statistics summary of amounts of the target molecule.

12. The computer-implemented method of claim 1, further comprising:
    selecting a plurality of pairs of locations on the subject's body for placement of the pair of transducer arrays;
    simulating, for each pair of locations, an expected electric field distribution through the target region for an electric field induced between the pair of transducer arrays at the pair of locations; and
    determining the recommendation of the second pair of locations to be the pair of locations for which the simulation yields a minimal variance of the electric field distribution in the target region while maintaining at least a predetermined electric field strength in the target region.

13. The computer-implemented method of claim 1, further comprising:
selecting a plurality of pairs of locations on the subject's body for placement of the pair of transducer arrays;
simulating, for each pair of locations, an expected electric field distribution through the target region for an electric field induced between the pair of transducer arrays at the pair of locations; and
determining the recommendation of the second pair of locations to be the pair of locations for which the simulation yields a maximum electric field strength in portions of the target region where the tumor treating fields did not reach a predetermined electric field strength.

14. The computer-implemented method of claim 1, further comprising:
determining the recommendation of the second pair of locations by applying a heuristic algorithm suggesting a change in locations of the pair of transducer arrays, the change in locations being expected to provide an increased distribution of tumor treating fields in the target region.

15. A computer-implemented method to determine placement of transducers on a subject's body for applying tumor treating fields, the computer comprising one or more processors and memory accessible by the one or more processors, the memory storing instructions that when executed by the one or more processors cause the computer to perform the method, the method comprising:
performing one or more simulations, using a simulation algorithm, of an expected electric field distribution through a target region of a first subject's body based on image data associated with the first subject;
determining a first location on the first subject's body for placement of a first transducer and a second location on the first subject's body for placement of a second transducer based on the one or more simulations;
receiving molecular imaging data comprising a concentration of a target molecule within the target region of the first subject's body after an electric field is induced between the first transducer located at the first location on the first subject's body and the second transducer located at the second location on the first subject's body;
adjusting one or more parameters of the simulation algorithm based on the concentration of the target molecule within the target region of the first subject's body to generate an updated simulation algorithm;
receiving image data associated with a second subject's body;
performing one or more second simulations, using the updated simulation algorithm, of an expected electric field distribution through a target region of the second subject's body based on the image data associated with the second subject's body; and
determining a first location on the second subject's body for placement of a first transducer and a second location on the second subject's body for placement of a second transducer based on the one or more second simulations.

16. The computer-implemented method of claim 15, further comprising:
performing one or more additional simulations, using the updated simulation algorithm, of the expected electric field distribution through the target region of the first subject's body based on the image data associated with the first subject's body; and
determining a recommendation of a second pair of locations for placement of the first transducer and the second transducer on the first subject's body based on the one or more additional simulations.

17. The computer-implemented method of claim 15, further comprising:
receiving molecular imaging data comprising a concentration of the target molecule within the target region of the second subject's body after an electric field is induced between the first transducer located at the first location on the second subject's body and the second transducer located at the second location on the second subject's body;
adjusting one or more parameters of the simulation algorithm based on the concentration of the target molecule within the target region of the second subject's body to generate a second updated simulation algorithm;
receiving image data associated with a third subject's body;
performing one or more third simulations, using the second updated simulation algorithm, of an expected electric field distribution through a target region of the third subject's body based on the image data associated with the third subject's body; and
determining a first location on the third subject's body for placement of a first transducer and a second location on the third subject's body for placement of a second transducer based on the one or more third simulations.

18. The computer-implemented method of claim 15, wherein the image data associated with the first subject's body and the image data associated with the second subject's body comprises at least one of: magnetic resonance imaging data, computed tomography data, positron emission tomography data, or X-ray imaging data.

19. A method of applying tumor treating fields to a region of interest within a subject's body, the method comprising:
placing a pair of transducers at a first pair of locations on the subject's body;
inducing an electric field between the pair of transducers located at the first pair of locations on the subject's body;
ceasing the electric field;
after ceasing the electric field, performing molecular imaging of the subject's body to determine a concentration of a target molecule within the region of interest;
determining an updated first pair of locations on the subject's body for placement of the pair of transducers, based on the concentration of the target molecule;
moving the pair of transducers to the updated first pair of locations on the subject's body; and
inducing another electric field between the pair of transducers.

20. The method of claim 19, further comprising:
updating a simulation algorithm based on the concentration of the target molecule;
performing one or more simulations of an expected electric field distribution within a region of interest in a second subject's body using the updated simulation algorithm; and
determining a first pair of locations on the second subject's body based on the one or more simulations.

* * * * *